(12) United States Patent
Yamamoto

(10) Patent No.: US 8,538,245 B2
(45) Date of Patent: Sep. 17, 2013

(54) RECORDING CONTROL APPARATUS AND RECORDING SYSTEM

(75) Inventor: Mikio Yamamoto, Tokyo (JP)

(73) Assignee: Sony Corporation (JP)

(*) Notice: Subject to any disclaimer, the term of this patent is extended or adjusted under 35 U.S.C. 154(b) by 946 days.

(21) Appl. No.: 12/214,464

(22) Filed: Jun. 19, 2008

(65) Prior Publication Data

US 2009/0016694 A1 Jan. 15, 2009

(30) Foreign Application Priority Data

Jul. 2, 2007 (JP) ................ P2007-174449

(51) Int. Cl.
*H04N 5/76* (2006.01)

(52) U.S. Cl.
USPC ............................................. 386/291

(58) Field of Classification Search
None
See application file for complete search history.

(56) References Cited

U.S. PATENT DOCUMENTS

| 2005/0251829 A1* | 11/2005 | Kondo et al. | 725/55 |
| 2006/0010464 A1 | 1/2006 | Azami | |
| 2006/0078277 A1 | 4/2006 | Miyazaki | |
| 2006/0093325 A1* | 5/2006 | Imai et al. | 386/83 |
| 2009/0103893 A1* | 4/2009 | Sugino et al. | 386/83 |

FOREIGN PATENT DOCUMENTS

| EP | 1014715 A2 | 6/2000 |
| EP | 1763174 A1 | 3/2007 |
| JP | 2005039559 A | 2/2005 |
| JP | 2005-217915 A | 8/2005 |
| JP | 2005-252402 A | 9/2005 |
| JP | 2005244372 A | 9/2005 |
| WO | 2005015906 | 2/2005 |
| WO | WO 2006123400 A1 * | 11/2006 |

OTHER PUBLICATIONS

Office Action from Japanese Application No. 2007-174449, dated Dec. 13, 2011.
Office Action from European Search Report EP 08159390, dated Oct. 21, 2011.

* cited by examiner

*Primary Examiner* — Michael S McNally
*Assistant Examiner* — Trong Nguyen
(74) *Attorney, Agent, or Firm* — Lerner, David, Littenberg, Krumholz & Mentlik, LLP

(57) ABSTRACT

A recording control apparatus includes the following elements. A receiving unit is configured to receive, from each of a plurality of recording apparatuses, recording schedule information set on a recording apparatus and available-recording-capacity information of the recording apparatus. A determination unit is configured to determine a program to be recorded. A control unit is configured to perform control to select one of the recording apparatuses on the basis of the recording schedule information and the available-recording-capacity information received from the plurality of recording apparatuses and to transmit, to the selected recording apparatus, information for scheduling the recording of the determined program.

7 Claims, 12 Drawing Sheets

FIG. 4  X1

| | | VCR 3A | DVD RECORDER 3B | DVD RECORDER 3C |
|---|---|---|---|---|
| 34 | DEVICE NAME | VCR 3A | DVD RECORDER 3B | DVD RECORDER 3C |
| 35 | TYPE | VIDEO CASSETTE RECORDER | DVD RECORDER | DVD RECORDER |
| 36 | NUMBER OF SIMULTANEOUSLY RECORDABLE PROGRAMS | 2 | 2 | 1 |
| 37 | RECEIVABLE CHANNELS | ANALOG TERRESTRIAL, CHANNELS 1, 3, 4, 6, 8, 10, 12 | ANALOG TERRESTRIAL, CHANNELS 1, 3, 4, 6, 8, 10, 12 | ANALOG TERRESTRIAL, CHANNELS 1, 3, 4, 6, 8, 10, 12 |
| | | DIGITAL TERRESTRIAL, CHANNELS 2, 4, 8 | DIGITAL TERRESTRIAL, CHANNELS 2, 4, 8 | |
| | | ANALOG BS, CHANNELS 5, 7, 9 | ANALOG BS, CHANNELS 5, 7, 9 | ANALOG BS, CHANNELS 5, 7, 9 |
| | | DIGITAL BS, CHANNELS 2, 6, 10 | DIGITAL BS, CHANNELS 2, 6, 10 | |
| 38 | MAXIMUM RECORDABLE TIME | 78 HOURS | 78 HOURS / 56 HOURS | 19 HOURS |
| 39 | RECORDING SCHEDULE | MAR 12 19:00 - 19:30 ANALOG TERRESTRIAL, CHANNEL 8 "EVENING NEWS" | MAR 12 19:00 - 21:00 DIGITAL BS, CHANNEL 6 "MOVIE A" | MAR 13 21:00 - 23:00 ANALOG TERRESTRIAL, CHANNEL 12 "MOVIE C" |
| | | MAR 13 15:00 - 17:00 ANALOG TERRESTRIAL, CHANNEL 3 "LIVE SOCCER" | MAR 12 21:00 - 23:00 DIGITAL TERRESTRIAL, CHANNEL 4 "MOVIE B" | MAR 15 15:00 - 15:30 ANALOG TERRESTRIAL, CHANNEL 10 "ANIMATED CARTOON B, REPEAT" |
| | | MAR 13 19:00 - 19:30 ANALOG BS, CHANNEL 7 "NEWS" | MAR 13 17:00 - 19:00 ANALOG TERRESTRIAL, CHANNEL 4 "LIVE PROFESSIONAL BASEBALL" | |
| | | MAR 15 15:00 - 15:30 ANALOG TERRESTRIAL, CHANNEL 6 "ANIMATED CARTOON A, REPEAT" | | |

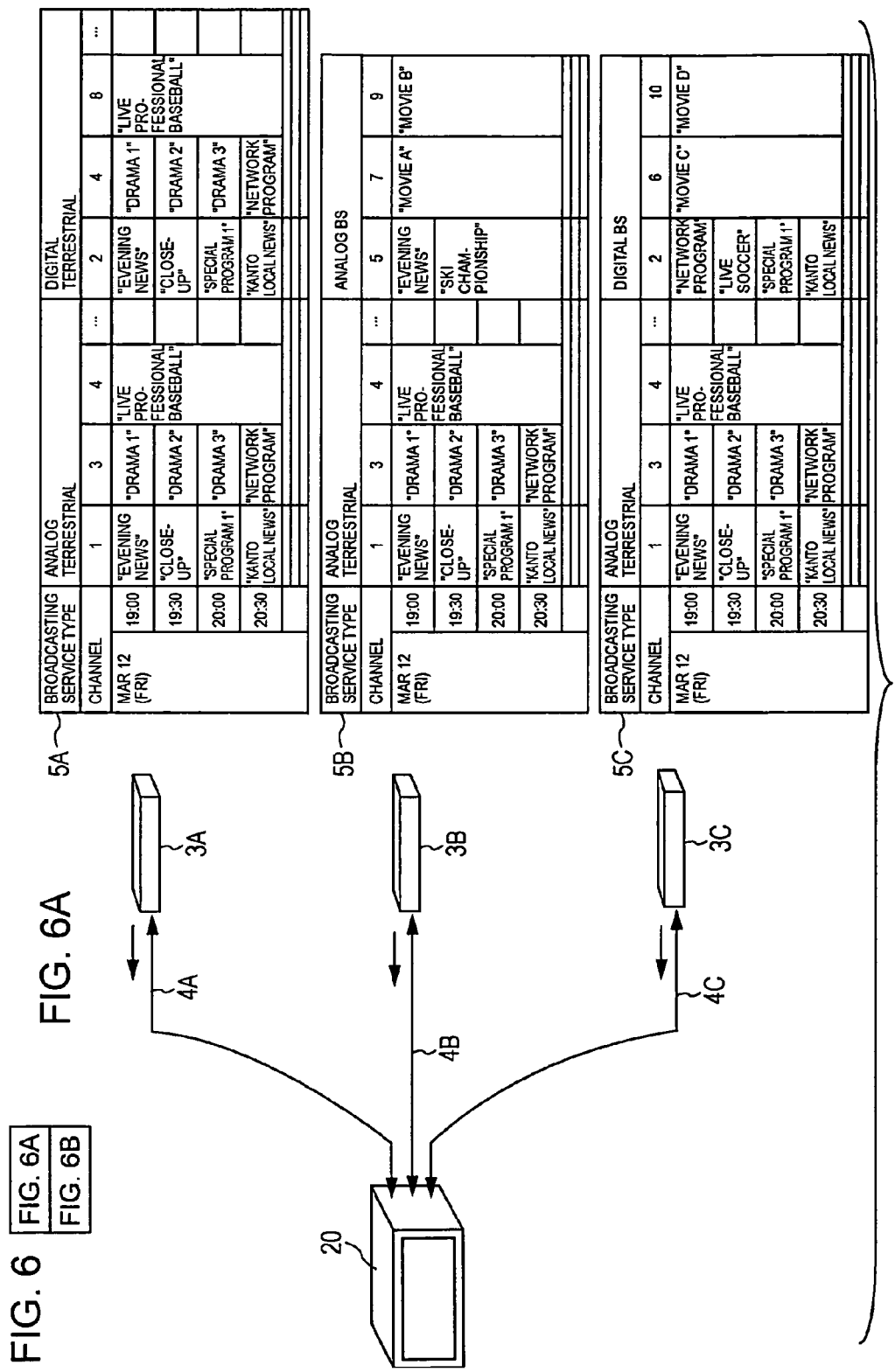

FIG. 6B

FROM FIG. 6A

| BROADCASTING SERVICE TYPE | ANALOG TERRESTRIAL | | | | ANALOG BS | | | | DIGITAL TERRESTRIAL | | | | DIGITAL BS | | | |
|---|---|---|---|---|---|---|---|---|---|---|---|---|---|---|---|---|
| CHANNEL | 1 | 3 | 4 | ... | 5 | 7 | 9 | ... | 2 | 4 | 8 | ... | 2 | 6 | 10 |
| MAR 12 (FRI) 19:00 | "EVENING NEWS" | "DRAMA 1" | "LIVE PRO-FESSIONAL BASEBALL" | | "EVENING NEWS" | "MOVIE A" | "MOVIE B" | | "EVENING NEWS" | "DRAMA 1" | "LIVE PRO-FESSIONAL BASEBALL" | | "NETWORK PROGRAM" | "MOVIE C" | "MOVIE D" |
| 19:30 | "CLOSE-UP" | "DRAMA 2" | | | "SKI CHAM-PIONSHIP" | | | | "CLOSE-UP" | "DRAMA 2" | | | "LIVE SOCCER" | | |
| 20:00 | "SPECIAL PROGRAM 1" | "DRAMA 3" | | | | | | | "SPECIAL PROGRAM 1" | "DRAMA 3" | | | "SPECIAL PROGRAM 1" | | |
| 20:30 | "KANTO LOCAL NEWS" | "NETWORK PROGRAM" | | | | | | | "KANTO LOCAL NEWS" | "NETWORK PROGRAM" | | | "KANTO LOCAL NEWS" | | |

Y1

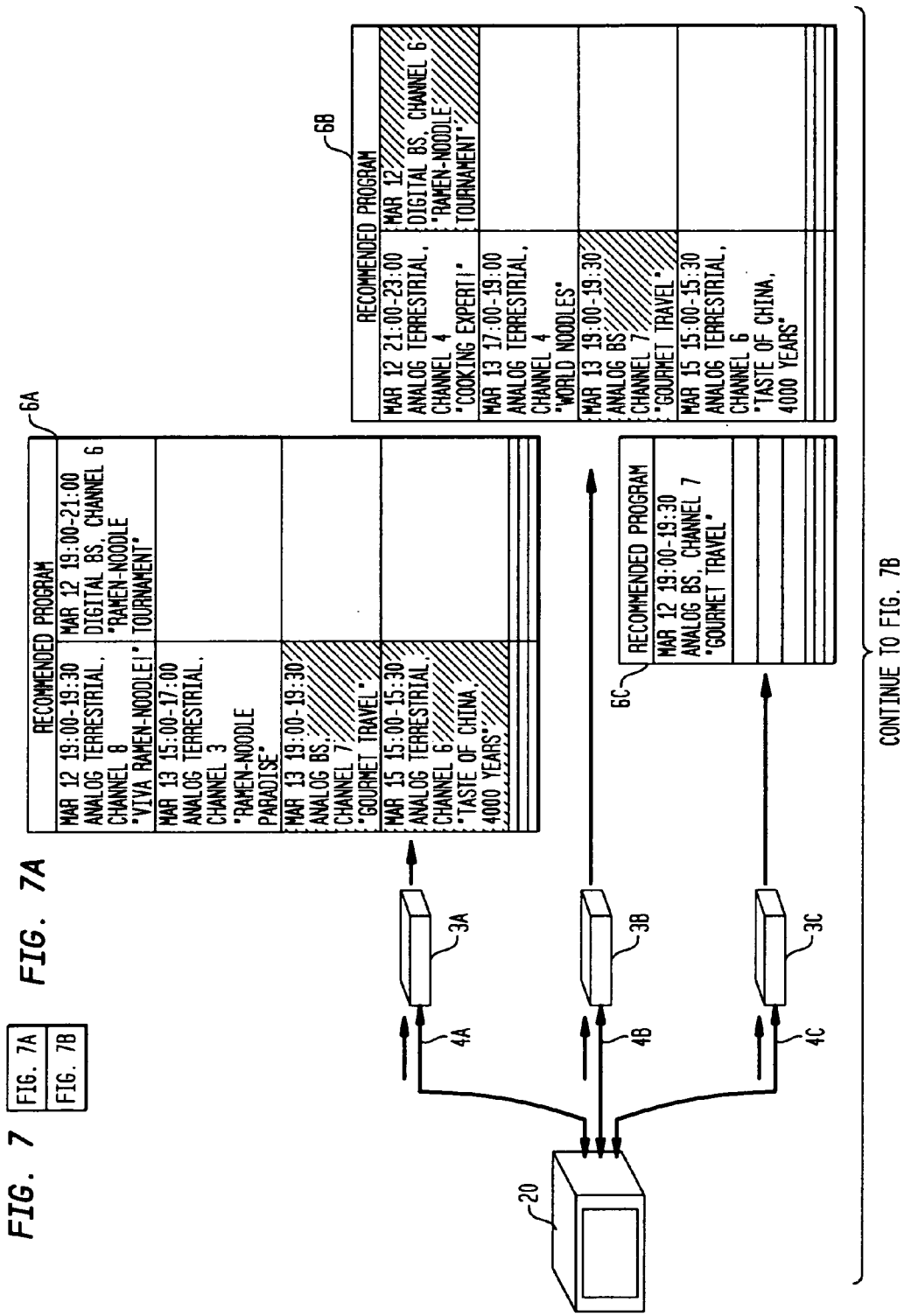

FIG. 7B
FROM FIG. 7A

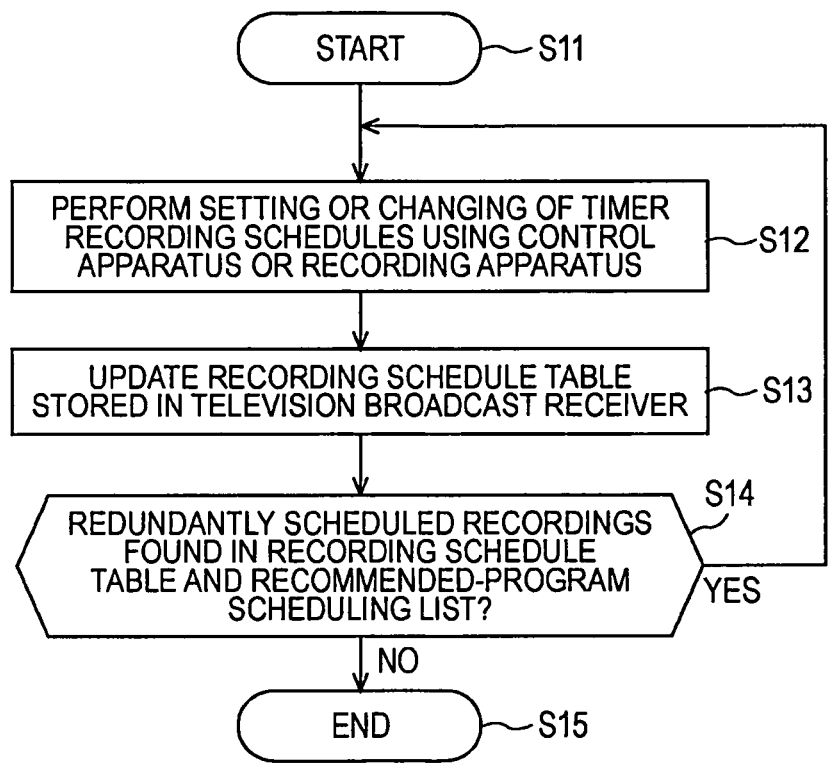

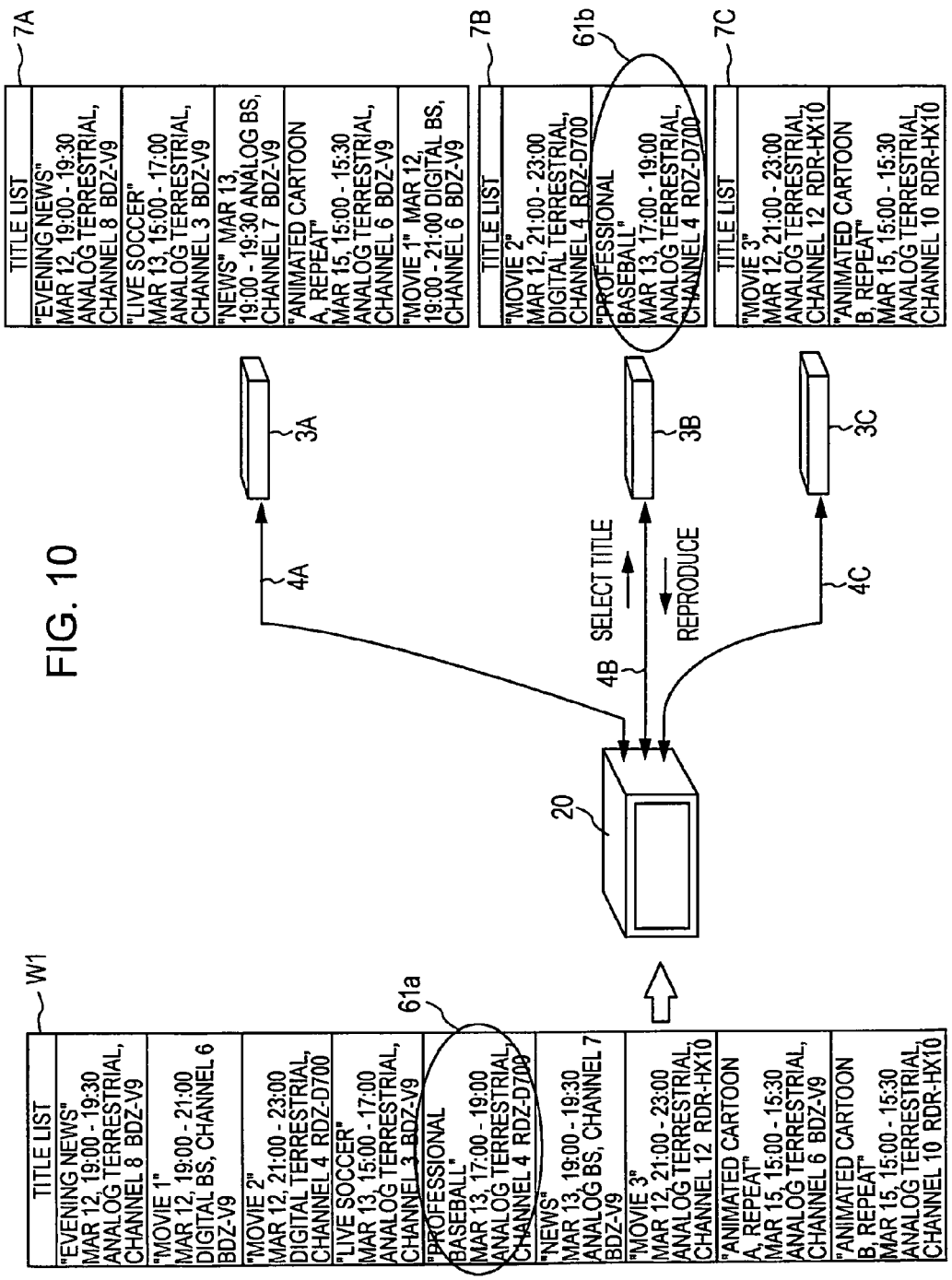

RECORDING CONTROL APPARATUS AND RECORDING SYSTEM

CROSS REFERENCES CROSS-REFERENCE TO RELATED APPLICATIONS

The present application claims priority from Japanese Patent Application No. JP 2007-174449, filed in the Japanese Patent Office on Jul. 2, 2007, the entire contents content of which is incorporated herein by reference.

BACKGROUND OF THE INVENTION

1. Field of the Invention

The present invention relates to a recording control apparatus and a recording system which are arranged to schedule recordings on a plurality of recording apparatuses.

2. Description of the Related Art

Recently, media-based recording apparatuses such as hard-disk-based recording apparatuses have become increasingly widespread, and recording apparatuses configured to schedule recordings for programs that are in the same broadcast time slot have also been available. For example, Japanese Unexamined Patent Application Publication Nos. 2005-217915 and 2005-252402 disclose techniques for managing recordings scheduled on a plurality of recording apparatuses using an integrated interface.

Japanese Unexamined Patent Application Publication No. 2005-217915 discloses a technique for displaying pieces of information for scheduling recordings for programs in order of broadcast time in a control apparatus arranged to schedule recordings on a plurality of recording apparatuses.

Japanese Unexamined Patent Application Publication No. 2005-252402 discloses a content recording system in which a plurality of devices having a function of scheduling a recording for program content are connected over a network so that a plurality of simultaneous video streams provided in the same time zone can be recorded using inactive resources on the network.

SUMMARY OF THE INVENTION

In the techniques disclosed in Japanese Unexamined Patent Application Publication Nos. 2005-217915 and 2005-252402, when a user schedules a new recording, the user is able to check information regarding recordings that have already been scheduled on a plurality of recording apparatuses to schedule the recording on any of the recording apparatuses. However, it is difficult to automatically schedule a recording in an optimal manner.

It is therefore desirable to provide a recording control apparatus and a recording system in which a recording can be automatically scheduled in an optimal manner using information such as recording schedule information regarding recordings that have already been scheduled on a plurality of recording apparatuses.

A recording control apparatus according to an embodiment of the present invention includes the following elements. A receiving unit is configured to receive, from each of a plurality of recording apparatuses, recording schedule information set on a recording apparatus and available-recording-capacity information of the recording apparatus. A determination unit is configured to determine a program to be recorded. A control unit is configured to perform control to select one of the recording apparatuses on the basis of the recording schedule information and the available-recording-capacity information received from the plurality of recording apparatuses and to transmit, to the selected recording apparatus, information for scheduling the recording of the determined program.

A recording system according to another embodiment of the present invention includes a plurality of recording apparatuses and a recording control apparatus. The recording control apparatus includes the following elements. A receiving unit is configured to receive, from each of the plurality of recording apparatuses, recording schedule information set on a recording apparatus and available-recording-capacity information of the recording apparatus. A determination unit is configured to determine a program to be recorded. A control unit is configured to perform control to select one of the recording apparatuses on the basis of the recording schedule information and the available-recording-capacity information received from the plurality of recording apparatuses and to transmit, to the selected recording apparatus, information for scheduling the recording of the determined program.

According to an embodiment of the present invention, a recording control apparatus includes a receiving unit configured to receive, from each of a plurality of recording apparatuses, recording schedule information set on a recording apparatus and available-recording-capacity information of the recording apparatus; a determination unit configured to determine a program to be recorded; and a control unit configured to perform control to select one of the recording apparatuses on the basis of the recording schedule information and the available-recording-capacity information received from the plurality of recording apparatuses and to transmit, to the selected recording apparatus, information for scheduling the recording of the determined program. Thus, a user can efficiently schedule recordings for a plurality of television programs on a plurality of recording apparatuses without taking the redundancy of scheduled recording time or the available capacity of recording media of the recording apparatuses into account.

BRIEF DESCRIPTION OF THE DRAWINGS

FIG. 4 is a diagram showing a recording schedule table;

FIG. 6 is a diagram showing a specific example of a process for creating a general program guide in the recording system;

FIG. 7 is a diagram showing a specific example of a process for scheduling a recording for a recommended program in the recording system;

FIG. 9 is a flowchart showing a process for changing the setting of a recommended-program scheduling list; and FIG. 10 is a diagram showing how a television broadcast receiver obtains titles of television programs recorded on recording apparatuses to create a title list.

DESCRIPTION OF THE PREFERRED EMBODIMENTS

Specific embodiments of the present invention will now be described in detail with reference to the drawings.

Figure 1:
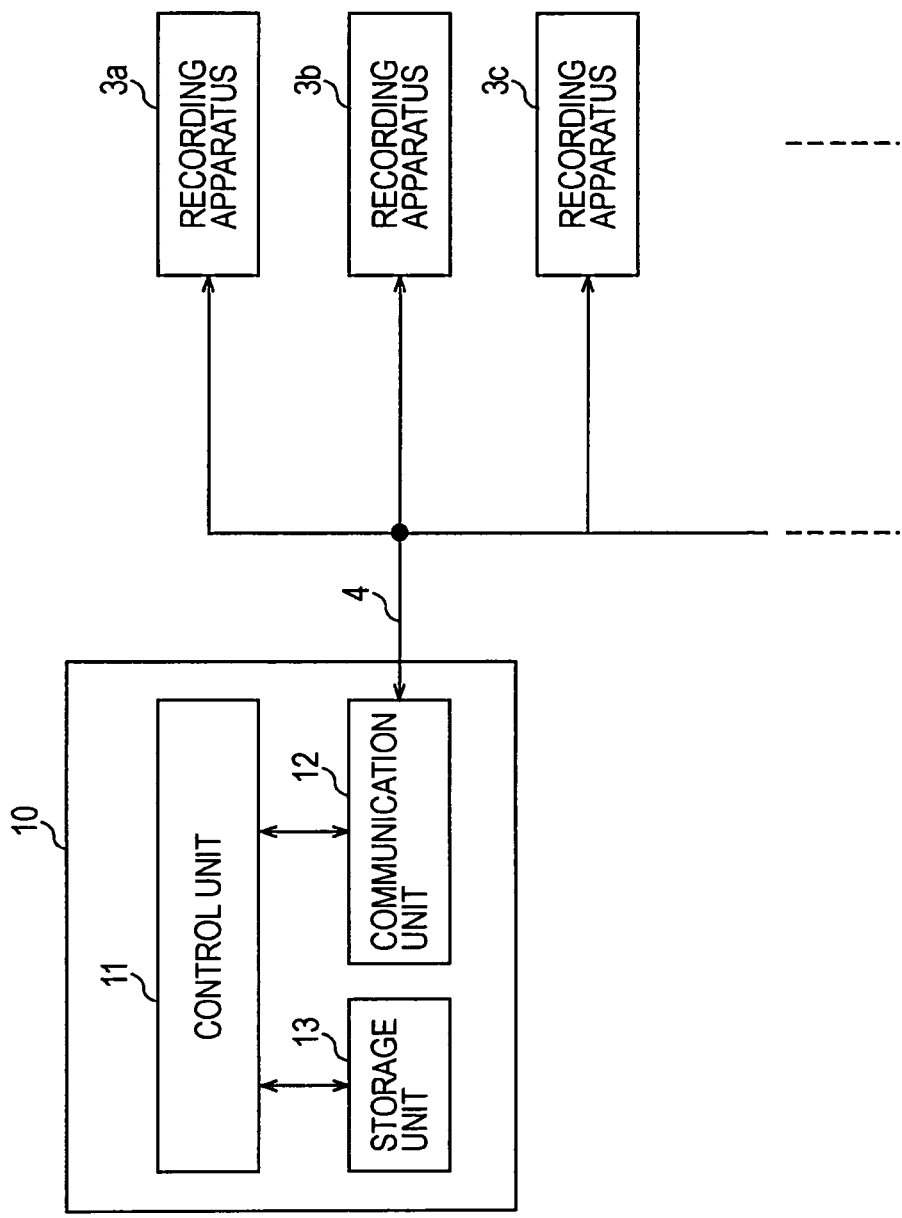
FIG. 1 is a schematic block diagram of a recording system according to an embodiment of the present invention.

FIG. 1 is a schematic block diagram of a recording system according to an embodiment of the present invention. The recording system shown in FIG. 1 includes a recording schedule control apparatus 10 and a plurality of recording apparatuses 3a, 3b, 3c, etc. In the recording system, at least recording schedule information, available-capacity information of a recording medium, and setting information regarding a program to be recorded are transmitted and received between the recording schedule control apparatus 10 and the plurality of recording apparatuses 3a, 3b, 3c, etc., via a wired or wireless communication path 4 so that the recording schedule control apparatus 10 can automatically schedule a recording in accordance with the status of recordings scheduled on the plurality of recording apparatuses 3a, 3b, 3c, etc.

Referring to FIG. 1, the recording schedule control apparatus 10 at least includes a control unit 11, a communication unit 12 whose operation is controlled by the control unit 11, and a storage unit 13 in which information such as recording schedule information is stored by the control unit 11. The communication unit 12 transmits and receives information regarding each of the plurality of recording apparatuses 3a, 3b, 3c, etc., such as recording schedule information regarding a recording scheduled thereon, available-recording-capacity information of a recording medium provided therein, and setting information regarding a program to be recorded thereby, to and from the recording apparatuses 3a, 3b, 3c, etc. The storage unit 13 includes a storage device such as a hard disk, a magnetic tape, a removable disk, or a flash memory, and stores the information received from each of the plurality of recording apparatuses 3a, 3b, 3c, etc., via the communication path 4, such as recording schedule information and available-recording-capacity information, and recording function information of each of the recording apparatuses 3a, 3b, 3c, etc., in the storage device in a form such as a table, described below. In the case of scheduling a recording, the control unit 11 performs control to select one recording apparatus on the basis of the information received from each of the recording apparatuses 3a, 3b, 3c, etc., which is stored in the storage unit 13, such as recording schedule information or available-recording-capacity information, and to transmit setting information regarding a program to be recorded to the selected recording apparatus through the communication unit 12.

Figure 2:
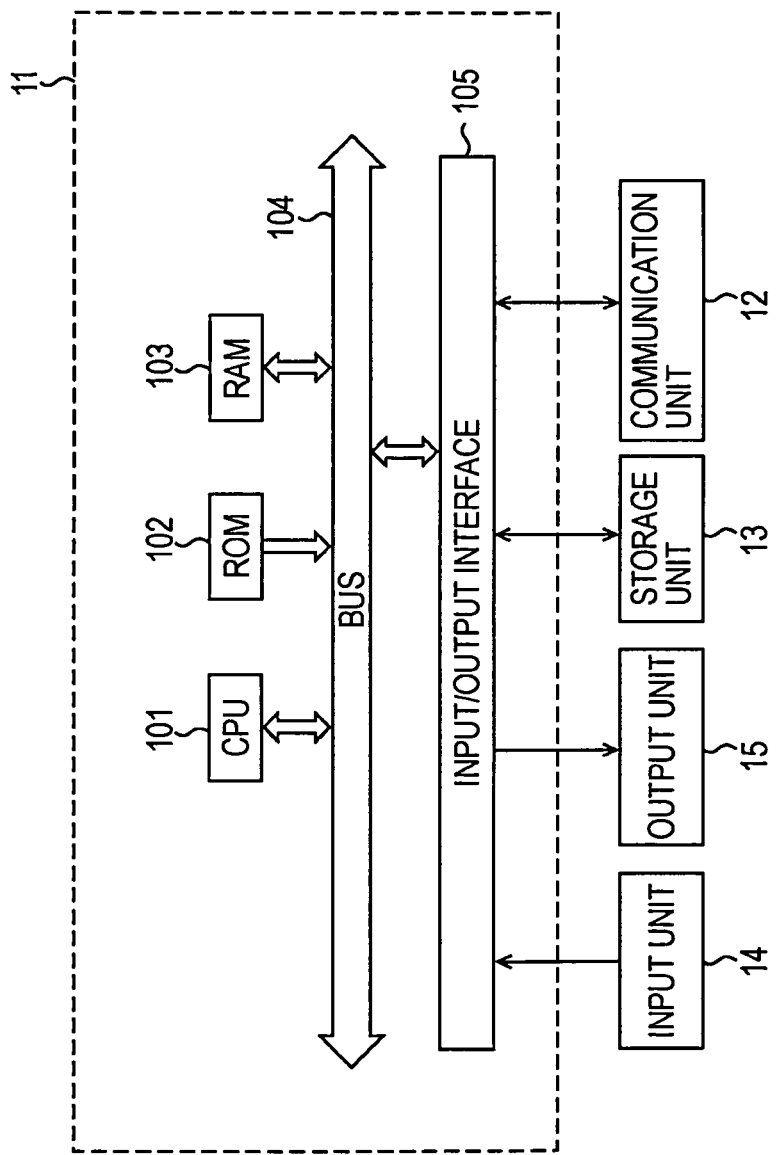
FIG. 2 is a schematic block diagram showing an example internal structure of a control unit of a recording schedule control apparatus and showing peripherals of the control unit.

FIG. 2 is a schematic block diagram showing an example internal structure of the control unit 11 of the recording schedule control apparatus 10 shown in FIG. 1 and showing peripherals of the control unit 11. The control unit 11 includes a central processing unit (CPU) 101, a read only memory (ROM) 102, a random access memory (RAM) 103, and an input/output interface (hereinafter referred to as an input/output. I/F) 105, which are connected to a bus 104. The input/output I/F 105 is connected to the communication unit 12, the storage unit 13, an input unit 14, and an output unit 15, and is adapted to input and output data to and from each of the communication unit 12, the storage unit 13, the input unit 14, and the output unit 15.

Referring to FIG. 2, the CPU 101 executes various types of processing according to a program stored in the ROM 102 or a program loaded into the RAM 103 from the storage unit 13. The RAM 103 also stores data necessary for the CPU 101 to execute various types of processing as necessary. The input unit 14 includes a keyboard and a mouse, and is adapted to enter various types of information used for the recording system according to a user's operation. The output unit 15 includes a display such as a cathode ray tube (CRT) display or a liquid crystal display (LCD) and speakers, and is adapted to output various types of setting information or to output sound and an image.

Figure 3:
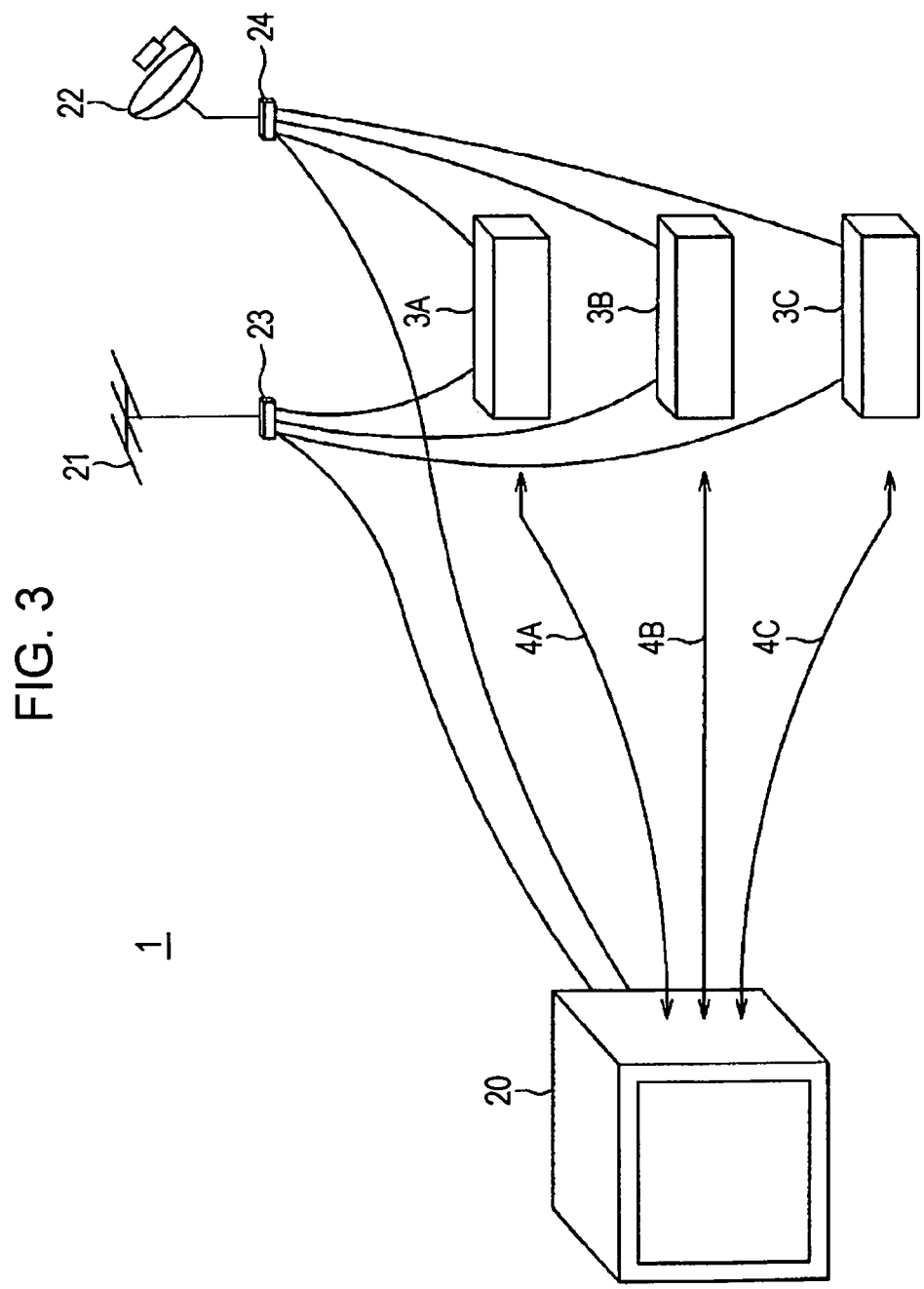
FIG. 3 is a diagram showing a specific example of the recording system according to the embodiment.

FIG. 3 is a diagram showing a specific example of the recording system of the present embodiment. A recording system 1 includes antennas 21 and 22, antenna splitters 23 and 24, a television broadcast receiver 20 having incorporated therein the recording schedule control apparatus 10 described above, I/Fs 4A, 4B, and 4C each of which may be a high definition multimedia interface (HDMI) compatible with the consumer electronics control (CEC) format, a video cassette recorder (VCR) 3A, and digital versatile disk (DVD) recorders 3B and 3C. The VCR 3A and the DVD recorders 3B and 3C transmit and receive a signal to and from the television broadcast receiver 20 via the I/Fs 4A, 4B, and 4C, respectively. The television broadcast receiver 20 includes, for example, the recording schedule control apparatus 10 shown in FIGS. 1 and 2, a tuner, and a display.

In the recording system 1, the antenna 21 receives broadcast waves of the very high frequency (VHF) band and the ultra high frequency (UHF) band, such as analog terrestrial television broadcasts and digital terrestrial television broadcasts. The antenna splitter 23 supplies a broadcast wave received by the antenna 21 to the television broadcast receiver 20, the VCR 3A, and the DVD recorders 3B and 3C. The antenna 22 receives satellite broadcast waves such as BS (Broadcast Satellite) broadcasts and CS (Communication Satellite) broadcasts. The antenna splitter 24 supplies a broadcast wave received by the antenna 22 to the television broadcast receiver 20, the VCR 3A, and the DVD recorders 3B and 3C.

The television broadcast receiver 20 includes, as elements used to receive a television broadcast, for example, a tuner, an encoder, and a decoder, which are not shown. The tuner demodulates a broadcast signal corresponding to a television broadcast wave that is received by the antennas 21 and 22, and supplies a video signal component and an audio signal component to the encoder. A terrestrial television broadcast signal received by the antenna 21 includes an electronic program guide (EPG) signal for television programs. The EPG signal is stored in the storage unit 13 via the bus 104. The television broadcast receiver 20 may further include a function of obtaining content over a network. In this case, the television broadcast receiver 20 may obtain an EPG signal included in the content.

The encoder encodes video and audio signals input by the tuner using, for example, MPEG (Moving Picture Experts Group) method, and supplies the encoded video and audio signals to the storage unit 13 for storage via the bus 104 and the input/output I/F 105. The video and audio signals stored in the storage unit 13 are supplied to the decoder via the input/output I/F 105 and the bus 104, and are decoded using MPEG method. The video and audio signals decoded by the decoder are supplied to the output unit 15 via the bus 104 and the input/output I/F 105. In a case where the received video or audio signal is not stored in the storage unit 13, the encoder and the decoder directly supply the video and audio signals obtained by demodulating the broadcast signal using the tuner to the output unit 15.

Upon receiving recording schedule information and recording-apparatus information from each of the VCR 3A and the DVD recorders 3B and 3C, the television broadcast receiver 20 stores the received information in the storage unit 13 in a form such as a table. The television broadcast receiver 20 creates a recording schedule table on the basis of the recording schedule information and the recording-apparatus information. The recording schedule table is used to schedule a recording for a television program, which is requested to be recorded by a user's input operation, on any of the VCR 3A and the DVD recorders 3B and 3C. The recording schedule information includes information for setting, for example, a recording time, a channel, and an image quality level. The recording-apparatus information includes, for example, information regarding the available capacity of a recording medium provided in each recording apparatus, and recording function information of each recording apparatus. The recording function information includes information indicating, for example, the number of simultaneously recordable programs, a receivable broadcast wave (such as terrestrial wave, BS wave, or CS wave), a receivable channel, and the type of an input terminal.

Specifically, the CPU 101 in the television broadcast receiver 20 requests the VCR 3A and the DVD recorders 3B and 3C through the communication unit 12 via the I/Fs 4A, 4B, and 4C, respectively, to transmit recording schedule information and recording-apparatus information, and receives recording schedule information and recording-apparatus information from each of the VCR 3A and the DVD recorders 3B and 3C. The CPU 101 creates a table in the storage unit 13, and stores the received information in the table. The CPU 101 creates, for example, a recording schedule table X1 shown in FIG. 4 on the basis of the recording schedule information and available-capacity information stored in the storage unit 13 to manage recording setting information of each recording apparatus. The recording setting information is setting information for allowing a user to schedule a recording for a television program desired to be recorded on any of the VCR 3A and the DVD recorders 3B and 3C. The recording setting information includes, for example, a recording date, a recording time zone, a broadcast channel of a television program to be recorded, and the title of a television program to be recorded.

The recording schedule table X1 includes a management region 31 in which recording schedule information and recording-apparatus information of the VCR 3A are stored, a management region 32 in which recording schedule information and recording-apparatus information of the DVD recorder 3B are stored, and a management region 33 in which recording schedule information and recording-apparatus information of the DVD recorder 3C are stored. The recording schedule table X1 also manages a device name 34, a device type 35, the number of simultaneously recordable programs 36, a receivable channel 37, a maximum recordable time 38, and a recording schedule 39 in association with the management regions 31, 32, and 33.

Referring to the recording schedule table X1, for example, the number of simultaneously recordable television programs is two for the VCR 3A and the DVD recorder 3B, and is one for the DVD recorder 3C. Further, for example, simultaneous recording of two broadcast waves is not permitted for analog terrestrial broadcasting or analog BS broadcasting while simultaneous recording of two broadcast waves is permitted for digital terrestrial broadcasting and digital BS broadcasting. Further, for example, the maximum recordable times of the VCR 3A and the DVD recorders 3B and 3C are 78 hours, 56 hours, and 19 hours, respectively. Referring to the recording schedule 39, for example, program "Evening News" on analog terrestrial broadcasting, channel 8, and program "Movie A" on digital BS broadcasting, channel 6, are scheduled for recording on the VCR 3A in the same time slot from 19:00 to 19:30 on March 12.

In the recording system 1, the television broadcast receiver 20 is requested by a user's input operation of the input unit 14 to display recording schedule information. In response to this request, the CPU 101 causes the recording schedule information managed by the recording schedule table X1 to be displayed on the display of the output unit 15. Thus, the user can have a general view of pieces of recording schedule information of recording apparatuses connected to the television broadcast receiver 20.

Figure 5:
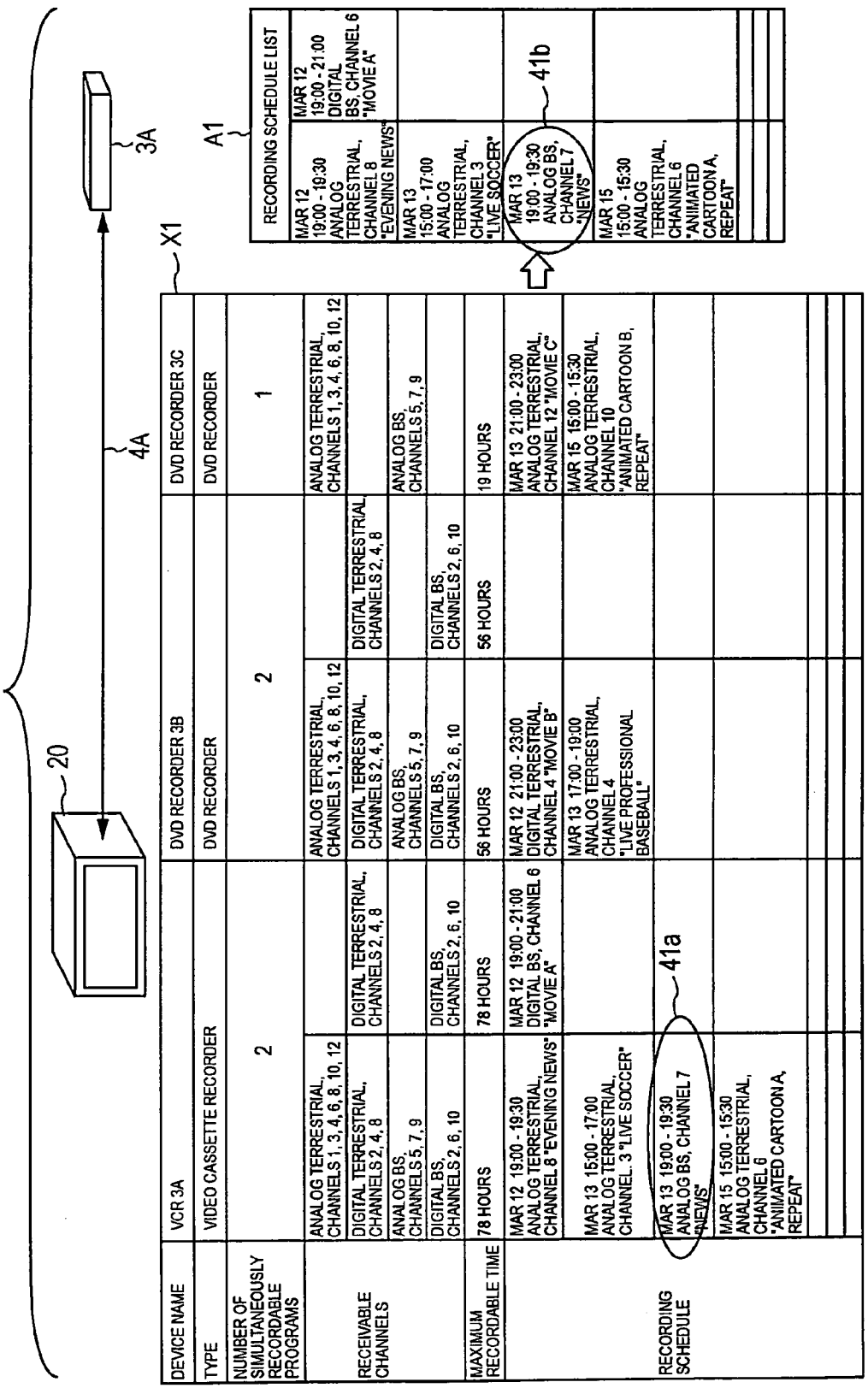
FIG. 5 is a diagram showing a specific example of a process for reflecting conditions entered by a user in recording schedule information.

The recording system 1 further enables changing of the recording schedule information in accordance with a user's operation. FIG. 5 is a diagram showing a specific example of a process for reflecting conditions entered by a user in recording schedule information. For example, the user operates the input unit 14 of the television broadcast receiver 20 to perform setting, such as addition, deletion, or changing of recording setting information, on a recording apparatus on which a television program desired to be recorded by the user has been scheduled for recording. In this case, the control unit 11 of the television broadcast receiver 20 recognizes the recording apparatus that performs the scheduled recording of the television program, and transmits the setting to the recognized recording apparatus to reflect the setting in recording schedule information stored in a memory provided in the recording apparatus. Specifically, in the example shown in FIG. 5, in response to a user's input operation of the television broadcast receiver 20, television program "News" on analog BS broadcasting, channel 7, which is scheduled to be recorded from 19:00 to 19:30 on March 13, managed in a management region 41a, is deleted in the recordings scheduled on the VCR 3A, which are managed by the recording schedule table X1. In this case, recording schedule information regarding the program "News", which is managed in a management region 41b of a recording schedule list A1 stored in a memory of the VCR 3A, is also deleted. At this time, the television broadcast receiver 20 transmits a response acknowledgement to a recording apparatus on which a recording has been scheduled as to whether the setting of the recording schedule is good or bad. This provides a match between the recording schedule table X1 stored in the television broadcast receiver 20 and a recording schedule table stored in the recording apparatus on which this recording schedule has been set. Further, for example, setting, such as addition, deletion, or changing of recording setting information, may be performed according to a user's input operation of a recording apparatus on which a recording has been scheduled. In this case, the recording apparatus reflects the setting in recording schedule information stored in a memory provided in this recording apparatus, and transmits the setting to the television broadcast receiver 20 so that the setting can be reflected in the recording schedule information managed in the recording schedule table X1.

In the recording system 1, furthermore, a recording apparatus on which a recording for a television program has been scheduled by the television broadcast receiver 20 can create a program guide for managing broadcast schedules of television programs and can store it as a program guide table. In this case, for example, as shown in FIG. 6, the control unit 11 of the television broadcast receiver 20 receives recording schedule information from program guide tables 5A, 5B, and 5C via the I/Fs 4A, 4B, and 4C, respectively. The program guide tables 5A, 5B, and 5C are stored in the VCR 3A, which is a recording apparatus on which a recording for a television program has been scheduled, and the DVD recorders 3B and 3C, respectively. The control unit 11 uses the received recording schedule information and an EPG signal obtained via the antenna 21 or a network to create a general program guide Y1 for managing television programs for every channel of analog terrestrial broadcasting, analog BS broadcasting, digital terrestrial broadcasting, and digital BS broadcasting, and stores the general program guide Y1 in the storage unit 13 as a general program guide table. The television broadcast receiver 20 displays the general program guide Y1 on the display of the output unit 15. The user can refer to the general program guide Y1 displayed by the television broadcast receiver 20 to select a television program desired to be recorded, and can therefore easily schedule the recording for the television program.

In the recording system 1, it is also possible to schedule a recording for a television program in accordance with preference information entered by a user. Specifically, the control unit 11 of the television broadcast receiver 20 enters user preference information, such as the genre, keyword, and time zone of a television program desired to be viewed by the user, in accordance with a user's input operation of the input unit 14, and creates and stores in the storage unit 13, for example, a preference information table S1 shown in FIG. 7. The control unit 11 further refers to the general program guide Y1 to estimate, as recommended programs, television programs that will be desired to be viewed by the user, and creates and stores in the storage unit 13, for example, a recommended-program recording schedule list Z1 shown in FIG. 7. The control unit 11 can also display the recommended-program recording schedule list Z1 on the display of the output unit 15. The control unit 11 refers to the recommended-program recording schedule list Z1, and receives available-capacity information of recording media or tuners provided in the VCR 3A and the DVD recorders 3B and 3C via the I/Fs 4A, 4B, and 4C, respectively. The control unit 11 determines a recording apparatus available for recording of the recommended programs on the basis of the received available-capacity information, and transmits recording setting information including the recommended programs to the determined recording apparatus to schedule a recording. The control unit 11 records the recommended programs on a plurality of recording apparatuses in descending order from the largest available capacity of the recording medium.

The television broadcast receiver 20 displays user preference information, such as a plurality of program attribute names constituting program attribute information relating to attributes of television programs to be recorded, on the display of the output unit 15, and obtains program attribute information that is selected by the user by referring to the displayed program attribute names and that is entered using the input unit 14. Examples of the program attribute names include, but are not limited to, foreign films, afternoon soap operas, dramas (repeat), baseball games, soccer games, midnight variety shows, Enka (Japanese ballad) music programs, classic music programs, news programs, cooking programs, spa programs, Go tournament programs, and Shogi or Japanese chess tournament programs.

The television broadcast receiver 20 may obtain user preference information using any method other than that described above. For example, the television broadcast receiver 20 may receive pieces of recording schedule information that have already been stored in memories of recording apparatuses connected thereto via the I/Fs 4A, 4B, and 4C, and may perform comprehensive determination of the received pieces of recording schedule information to estimate user preference information. The estimated user preference information may be registered and stored in a table prepared in the memory.

A specific example will now be described with reference to FIG. 7. For example, a user inputs program attribute names "ramen-noodle" and "cooking" and a recording time zone "evening" to the television broadcast receiver 20. In this case, the input pieces of preference information are registered and stored in the preference information table S1 prepared in the memory. The control unit 11 of the television broadcast receiver 20 creates the recommended-program recording schedule list Z1 on the basis of the pieces of preference information stored in the preference information table S1 and the available capacity of the recording media provided in the VCR 3A and the DVD recorders 3B and 3C.

Figure 7B:
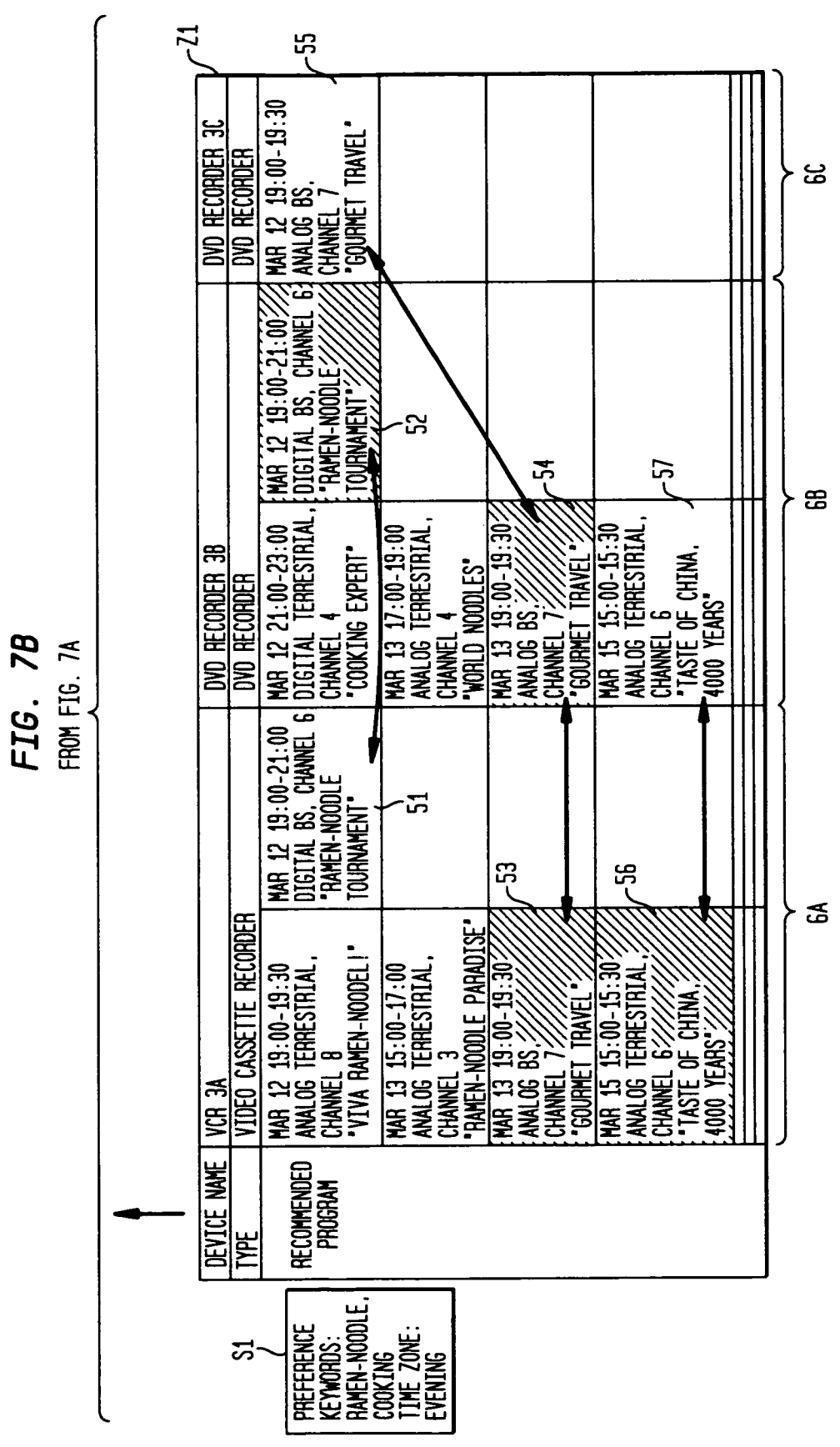

In a case where the recommended-program recording schedule list Z1 shown in FIG. 7 includes a television program that is redundantly managed as recording schedule setting information in a plurality of recording apparatuses, the control unit 11 deletes recording schedule setting information regarding the redundantly managed television program, except for recording schedule setting information regarding the redundantly managed television program that is stored in a memory having the largest remaining capacity, on the basis of information such as the available capacity of the recording media provided in the recording apparatuses or receivable broadcasting (such as analog terrestrial broadcasting, digital terrestrial broadcasting, BS broadcasting, or CS broadcasting).

In the recommended-program recording schedule list Z1, for example, recording schedule information regarding television program "Ramen-Noodle Tournament" is redundantly managed in a management region 51 for the VCR 3A and a management region 52 for the DVD recorder 3B. In the example shown in FIG. 7, the recording schedule information managed in the management region 52 is deleted. For recording schedule information regarding television program "Gourmet Travel", which is redundantly managed in management regions 53, 54, and 55, the recording schedule information stored in the management regions 53 and 54 is deleted. For recording schedule information regarding television program "Taste of China 4000 years", which is redundantly managed in management regions 56 and 57, the recording schedule information stored in the management region 56 is deleted.

Then, the pieces of recording schedule setting information of the VCR 3A and the DVD recorders 3B and 3C stored in the recommended-program recording schedule list Z1 are transmitted as recording schedule recommendation information lists 6A, 6B, and 6C to the VCR 3A and the DVD recorders 3B and 3C via the I/Fs 4A, 4B, and 4C, respectively.

Figure 8:
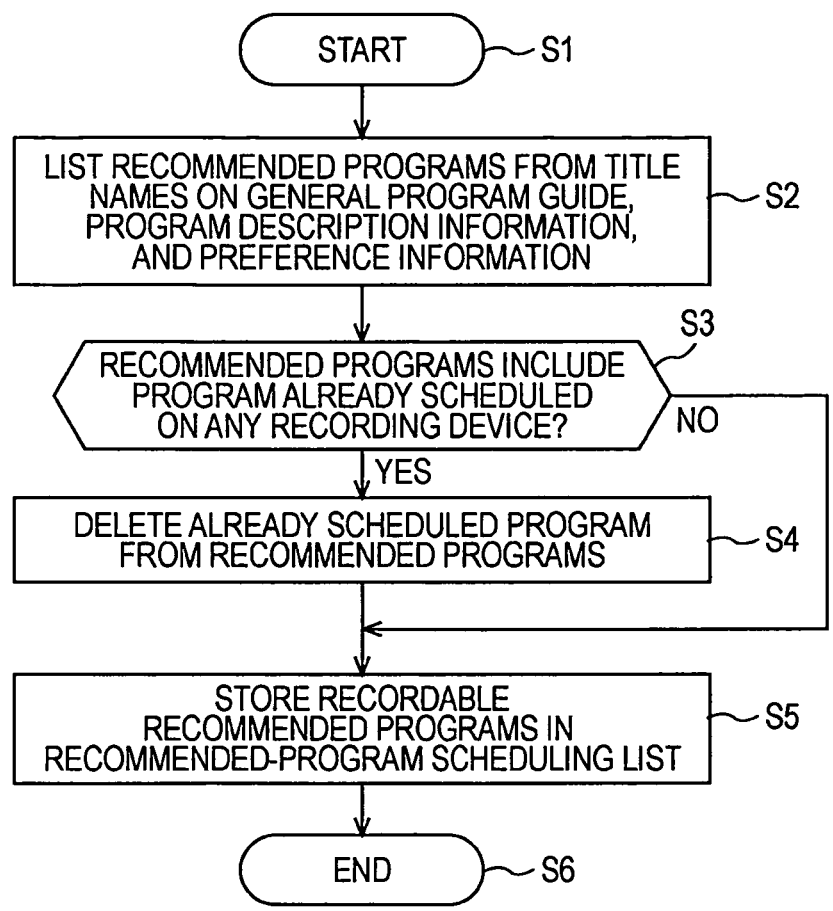
FIG. 8 is a flowchart showing a process for scheduling a recording for a recommended program in the recording system.

A process for scheduling a recording for a recommended program in the recording system 1 will now be described with reference to a flowchart of FIG. 8. In step S1, a process for scheduling a recording for a recommended program in the recording system 1 starts. Then, in step S2, the control unit 11 refers to the title names of television programs and other information relating to the television programs from the general program guide Y1, and also refers to a table having preference information managed therein to estimate television programs which will be desired to be viewed by a user on the basis of those pieces of information. The control unit 11 lists the estimated television programs as recommended programs. In step S3, the control unit 11 determines whether or not the listed recommended programs include a television program that has already been scheduled for recording on a recording apparatus. If it is determined in step S3 that the listed recommended programs include a television program that has already been scheduled for recording on a recording apparatus, the process proceeds to step S4. In step S4, the control unit 11 deletes the television program that has already been scheduled for recording on a recording apparatus from the listed recommended programs. If it is determined in step S3 that the listed recommended programs do not include a television program that has already been scheduled for recording on a recording apparatus, the process proceeds to step S5. In step S5, the control unit 11 creates a recommended-program scheduling list in which remaining recommended programs that are not deleted in step S4 are set as recordable recommended programs, and stores the recommended-program scheduling list in the storage unit 13. Then, in step S6, the process for scheduling a recording for a recommended program in the recording system 1 ends.

In the recording system 1, in some cases, the setting of the recommended-program scheduling list may be changed. The operation of the television broadcast receiver 20 in such cases will now be described with reference to a flowchart of FIG. 9. In step S11, a process for changing the setting of the recommended-program scheduling list starts. Then, in step S12, the television broadcast receiver 20 receives an input of information for adding or changing recording setting information based on a user's input operation from any of the television broadcast receiver 20, the VCR 3A, and the DVD recorders 3B and 3C. In step S13, the control unit 11 updates the recording schedule table X1 stored in the storage unit 13. In step S14, the television broadcast receiver 20 checks the recording schedule table X1 and the recommended-program scheduling list, and determines whether or not there exists a television program redundantly stored in the recording schedule table X1 and the recommended-program scheduling list. If it is determined in step S14 that any redundantly recorded television program exists, the process returns to step S12, and the process for performing setting of the recommended-program scheduling list is performed again. If it is determined in step S14 that no redundantly stored television program exists, the process proceeds to step S15, and the series of processing steps ends.

In the recording system 1, furthermore, the television broadcast receiver 20 is capable of obtaining titles of television programs stored in recording apparatuses connected to the television broadcast receiver 20 to create a title list so that a user can refer to the title list to select a television program, and is capable of reproducing the selected television program. Specifically, for example, as shown in FIG. 10, the VCR 3A and the DVD recorders 3B and 3C have stored in memories thereof information about a title of a television program recorded on or reproduced from a recording medium, which is created as tables of title lists 7A, 7B, and 7C, respectively. The control unit 11 of the television broadcast receiver 20 receives information about titles of television programs stored in the VCR 3A and the DVD recorders 3B and 3C via the I/Fs 4A, 4B, and 4C, respectively, and creates and stores a table of a title list W1 in the storage unit 13. The control unit 11 further displays the title list W1 on the display of the output unit 15. A user operates the input unit 14 and selects the title of a television program desired to be viewed from the displayed title list, e.g., "Professional Baseball", which is managed in a management region 61a of the title list W1. Then, the control unit 11 selects the DVD recorder 3B, which is a recording apparatus on which the selected title "Professional Baseball" is stored, and extracts information regarding the television program "Professional Baseball", which is managed in a management region 61b, on the basis of the title list stored in the memory of the DVD recorder 3B. The control unit 11 receives the information about the television program "Professional Baseball" via the I/F 4B, and reproduces the television program "Professional Baseball".

The recording system 1 according to the foregoing embodiment, therefore, allows a user to efficiently schedule recordings for a plurality of television programs on a plurality of recording apparatuses without taking the redundancy of scheduled recording time or the available capacity of recording media of the recording apparatuses into account.

The recording system 1 further enables a plurality of recording apparatuses connected to the television broadcast receiver 20 to be handled as a single recording apparatus, thus improving the ease of use of the plurality of recording apparatuses.

The recording system 1 further enables comprehensive management of a program guide including listings of television programs to be recorded by a plurality of recording apparatuses to determine the available capacity of recording media provided in the recording apparatuses. This allows recordings for television programs to be scheduled in a distributed manner across the recording apparatuses to prevent the occurrence of unbalanced use of recording media provided in the plurality of recording apparatuses.

The foregoing embodiment of the present invention is not to be taken in a limiting sense, and it is to be understood that a variety of modifications or changes may be made without departing from the scope of the present invention.

In the foregoing embodiment, a signal is transmitted to and received from a plurality of recording apparatuses using CEC-compatible HDMI interfaces. Alternatively, for example, a digital interface such as Ethernet (registered trademark) local area network (LAN) or an Institute of Electrical and Electronic Engineers (IEEE) 1394 interface may be used. As an alternative, a remote controller may be used to control transmission and reception of signals. For example, in case of using a recording apparatus capable of performing control using a remote controller, when a user schedules a recording for a television program, a signal to be transmitted from the television broadcast receiver 20 to this recording apparatus may be transmitted to a remote control transmission unit based on infrared or any other transmission technology and may be transmitted to a remote control receiving unit provided in the recording apparatus via infrared transmission.

In the foregoing embodiment, furthermore, the television broadcast receiver 20 has a recording schedule control function. Alternatively, any of a plurality of recording apparatuses may have a recording schedule control function.

In the foregoing embodiment, furthermore, the antenna splitter 24 supplies a broadcast wave received by the antenna 22 to the television broadcast receiver 20, the VCR 3A, and the DVD recorders 3B and 3C. A broadcast signal received by the antennas 21 and 22 may be supplied to the apparatuses 3A, 3B, and 3C using any other method. For example, a broadcast signal output from the antenna splitters 23 and 24 may be received by a tuner provided in the television broadcast receiver 20, and may be transmitted to the VCR 3A and the DVD recorders 3B and 3C via the I/Fs 4A, 4B, and 4C, respectively.

It should be understood by those skilled in the art that various modifications, combinations, sub-combinations and alterations may occur depending on design requirements and other factors insofar as they are within the scope of the appended claims or the equivalents thereof.

What is claimed is:
1. A recording control apparatus comprising:
 a receiving unit configured to receive, from each of a plurality of recording apparatuses, recording schedule information set on and available-recording-capacity information of each of the plurality of recording apparatuses, respectively;
 a determination unit configured to determine a program to be recorded; and
 a control unit configured to perform control to select one of the recording apparatuses on the basis of the recording schedule information and the available-recording-capacity information received from the plurality of record- ing apparatuses and to transmit, to the selected recording apparatus, information for scheduling recording of the determined program, wherein the control unit, when a determination is that recordings of a recommended program, the recommended program being determined by the determination unit as a program to be recorded on a basis of user preference information, have been redundantly scheduled on the plurality of recording apparatuses, automatically combines the redundantly scheduled recordings into one recording, by deleting recording schedule setting information for the recommended program for each of the plurality of recording apparatuses on which the recommended program is redundantly scheduled except for a recording apparatus of the plurality of recording apparatuses on which the recommended program is redundantly scheduled having a largest remaining capacity, to obtain information for scheduling recording of the recommended program for transmission to the recording apparatus having the largest remaining capacity.

2. The recording control apparatus according to claim 1, wherein the determination unit determines the user preference information using at least one of the recording schedule information received from the plurality of recording apparatuses, registered preference information registered in the plurality of recording apparatuses, and input preference information input by a user, and determines the recommended program as the program to be recorded on the basis of the determined user preference information, and wherein the control unit schedules a recording for the recommended program on the recording apparatus selected from among the plurality of recording apparatuses on the basis of the recording schedule information and the available-recording-capacity information received from the plurality of recording apparatuses.

3. The recording control apparatus according to claim 2, wherein if the user changes the user preference information, the control unit selects a recommended program again and changes recording schedules on the plurality of recording apparatuses.

4. The recording control apparatus according to claim 1, further comprising a display unit configured to display the recording schedule information received from the plurality of recording apparatuses.

5. The recording control apparatus according to claim 1, wherein the receiving unit is further configured to receive recording function information from each of the recording apparatuses, and wherein the control unit selects one of the recording apparatuses on the basis of the recording schedule information, the available-recording-capacity information and the recording function information received from the plurality of recording apparatuses.

6. A recording control method comprising the steps of:
receiving, from each of a plurality of recording apparatuses, recording schedule information set on and available-recording-capacity information of each of the plurality of recording apparatuses, respectively;
determining a program to be recorded; and
performing control to select one of the recording apparatuses on the basis of the recording schedule information and the available-recording-capacity information received from the plurality of recording apparatuses and to transmit, to the selected recording apparatus, information for scheduling recording of the determined program, wherein the performing control includes, when a determination is that recordings of a recommended program, the recommended program being determined as a program to be recorded on a basis of user preference information, have been redundantly scheduled on the plurality of recording apparatuses, to automatically combine the redundantly scheduled recordings into one recording, by deleting recording schedule setting information for the recommended program for each of the plurality of recording apparatuses on which the recommended program is redundantly scheduled except for a recording apparatus of the plurality of recording apparatuses on which the recommended program is redundantly scheduled having a largest remaining capacity, to obtain information for scheduling recording of the recommended program for transmission to the recording apparatus having the largest remaining capacity.

7. A recording system comprising:
a plurality of recording apparatuses; and
a recording control apparatus, the recording control apparatus including
a receiving unit configured to receive, from each of the plurality of recording apparatuses, recording schedule information set on and available-recording-capacity information of each of the plurality of recording apparatuses, respectively;
a determination unit configured to determine a program to be recorded; and
a control unit configured to perform control to select one of the recording apparatuses on the basis of the recording schedule information and the available-recording-capacity information received from the plurality of recording apparatuses and to transmit, to the selected recording apparatus, information for scheduling recording of the determined program, wherein the control unit, when a determination is that recordings of a recommended program, the recommended program being determined by the determination unit as a program to be recorded on a basis of user preference information, have been redundantly scheduled on the plurality of recording apparatuses, automatically combines the redundantly scheduled recordings into one recording, by deleting recording schedule setting information for the recommended program for each of the plurality of recording apparatuses on which the recommended program is redundantly scheduled except for a recording apparatus of the plurality of recording apparatuses on which the recommended program is redundantly scheduled having a largest remaining capacity, to obtain information for scheduling recording of the recommended program for transmission to the recording apparatus having the largest remaining capacity.

* * * * *